United States Patent
Leweke et al.

(10) Patent No.: US 9,938,961 B2
(45) Date of Patent: Apr. 10, 2018

(54) METHOD FOR OPERATING A WIND ENERGY INSTALLATION, AND WIND ENERGY INSTALLATION

(71) Applicant: SENVION SE, Hamburg (DE)

(72) Inventors: Henning Leweke, Kiel (DE); Karsten Warfen, Söhren (DE)

(73) Assignee: Senvion SE, Hamburg (DE)

( * ) Notice: Subject to any disclaimer, the term of this patent is extended or adjusted under 35 U.S.C. 154(b) by 304 days.

(21) Appl. No.: 14/719,021

(22) Filed: May 21, 2015

(65) Prior Publication Data
US 2015/0260157 A1  Sep. 17, 2015

Related U.S. Application Data

(63) Continuation of application No. PCT/EP2013/003531, filed on Nov. 22, 2013.

(30) Foreign Application Priority Data

Nov. 22, 2012 (DE) .......... 10 2012 221 345

(51) Int. Cl.
F03D 7/02 (2006.01)
F03D 1/06 (2006.01)
F03D 17/00 (2016.01)
(Continued)

(52) U.S. Cl.
CPC ......... F03D 7/0264 (2013.01); F03D 1/0608 (2013.01); F03D 7/0204 (2013.01);
(Continued)

(58) Field of Classification Search
CPC .... F03D 1/0608; F03D 7/0204; F03D 7/0224; F03D 7/0296; F03D 9/25; F03D 13/20;
(Continued)

(56) References Cited

U.S. PATENT DOCUMENTS 7,933,744 B2 * 4/2011 Jammu ................. F03D 7/026
702/185
7,942,629 B2 * 5/2011 Shi ........................ F03D 7/02
415/1
(Continued)

FOREIGN PATENT DOCUMENTS

DE 102008044652 A1 3/2010
DE 102010041508 A1 3/2012
(Continued)

OTHER PUBLICATIONS

Daycounter, Inc., Computationally Efficient Moving Average for Micorcontrollers, Apr. 19, 2012; Retrieved from the internet on Jun. 8, 2017: <URL: https://web.archive.org/web/20120419193613/http://www.daycounter.com/LabBook/Moving-Average.phtml>.*
(Continued)

Primary Examiner — Woody Lee, Jr.
Assistant Examiner — Sang K Kim
(74) Attorney, Agent, or Firm — Rankin, Hill & Clark LLP

(57) ABSTRACT

A method for operating a wind energy installation having a tower, a nacelle arranged on the tower, the azimuth of which can be adjusted, and a rotor having at least one rotor blade, the blade angle of which can be adjusted, in which tower oscillations are detected and monitored during operation using at least one measuring apparatus and power operation is switched off if a sliding average of the tower oscillations exceeds a tower oscillation limit value. The tower oscillation limit value is defined, at least during load operation of the wind energy installation, as at least one limit value function which is dependent on a sliding average of prevailing wind speed and/or a parameter associated therewith, and has different functional dependencies in a plurality of different value ranges of the prevailing wind speed or the parameter associated therewith. The invention also relates to a wind energy installation.

20 Claims, 2 Drawing Sheets

(51) Int. Cl.
*F03D 13/20* (2016.01)
*F03D 9/25* (2016.01)

(52) U.S. Cl.
CPC ......... *F03D 7/0224* (2013.01); *F03D 7/0296* (2013.01); *F03D 9/25* (2016.05); *F03D 13/20* (2016.05); *F03D 17/00* (2016.05); *F05B 2240/912* (2013.01); *F05B 2270/334* (2013.01); *F05B 2270/807* (2013.01); *Y02E 10/721* (2013.01); *Y02E 10/723* (2013.01); *Y02E 10/728* (2013.01)

(58) Field of Classification Search
CPC .. F03D 17/00; F03D 7/0264; F05B 2240/912; F05B 2270/334; F05B 2270/807; Y02E 10/721; Y02E 10/723; Y02E 10/728
See application file for complete search history.

(56) References Cited

U.S. PATENT DOCUMENTS

| | | | |
|---|---|---|---|
| 8,025,476 B2* | 9/2011 | Zheng | F03D 7/0224 415/1 |
| 8,102,067 B2 | 1/2012 | Bilges et al. | |
| 8,928,165 B2* | 1/2015 | Vasak | G01R 31/42 290/44 |
| 2004/0108729 A1 | 6/2004 | Wobben | |
| 2007/0216166 A1* | 9/2007 | Schubert | F03D 7/0224 290/55 |
| 2009/0261588 A1* | 10/2009 | Von Mutius | F03D 7/0224 290/44 |
| 2011/0064573 A1 | 3/2011 | Viripullan et al. | |
| 2012/0055247 A1* | 3/2012 | Gonzalez Castro | F03D 17/00 73/455 |
| 2012/0139440 A1 | 6/2012 | Kimura et al. | |
| 2013/0177418 A1 | 7/2013 | Hansen et al. | |

FOREIGN PATENT DOCUMENTS

| | | |
|---|---|---|
| DE | 102010053523 A1 | 6/2012 |
| WO | 2002075153 A1 | 9/2002 |

OTHER PUBLICATIONS

Knudsen et al.; "Detection of Excessive Wind Turbine Tower Oscillations Fore-Aft and Sideways"; 2012 American Control Conference; 2012; IEEE; Jun. 27, 2012; pp. 5795-5800; XP032244364.
International Search Report dated Feb. 24, 2014 in corresponding International Patent Application No. PCT/EP2013/003531.

* cited by examiner

METHOD FOR OPERATING A WIND ENERGY INSTALLATION, AND WIND ENERGY INSTALLATION

CROSS-REFERENCE TO RELATED APPLICATIONS

This application is a continuation of PCT/EP2013/003531, filed Nov. 22, 2013, and claims priority to DE 102012221345.7, filed Nov. 22, 2012.

BACKGROUND OF INVENTION

1. Field of Invention

The invention relates to a method for operating a wind energy installation having a tower, a nacelle which is arranged on the tower and the azimuth of which can be adjusted, and a rotor having at least one rotor blade, the blade angle of which can be adjusted, tower oscillations being detected and monitored during operation of the wind energy installation using at least one measuring apparatus and the power operation of the wind energy installation being switched off if a measurement variable, in particular a sliding average, of the tower oscillations exceeds a tower oscillation limit value. The invention also relates to a wind energy installation.

2. Brief Description of Related Art

Corresponding wind energy installations having a tower, on the top of which is arranged a nacelle with a rotor, are structures which are very prone to oscillation. Oscillations may be excited by asymmetries in the installation, for example incorrect blade positions, aerodynamic or mechanical imbalances, or by the tower dam effect, but also by adverse environmental conditions, for example extraordinary turbulence outside the design specifications, by ice build-up or by variable inflow conditions. These tower oscillations stress the material of the tower during operation of a wind energy installation and are taken into account when designing the load-bearing capacity of the tower for a planned service life of the tower.

In order to prevent the occurrence of tower oscillations which stress the tower beyond the acceptable degree, tower oscillations are usually monitored and the load operation of the installation is switched off if a permanently predefined limit value which is specific to the installation is exceeded. This prevents excessive oscillation events from shortening the service life of the tower beyond a tolerable degree.

Two permanently parameterized switch-off thresholds for the tower acceleration have previously usually been implemented, one with a short switch-off time, for example one to two half-oscillations of the tower and with a higher limit value, and one with a somewhat longer switch-off time, for instance five to six half-oscillations and with a low limit value. Since conventional tower natural frequencies are 0.2 to 0.5 Hz, the observed duration is therefore 2.5 to 5 seconds for the short period and 7.5 to 15 seconds for the longer period. In this case, the limit values must be so highly parameterized that no triggering is carried out even in the case of a switch-off wind in the normal situation, that is to say at high wind speeds at which the wind energy installation is regularly switched off. It is also known in the prior art to reduce the power and/or rotational speed of a wind energy installation when high oscillation levels occur in order to reduce the oscillation level without switching off the wind energy installation.

BRIEF SUMMARY OF THE INVENTION

In contrast, the object on which the present invention is based is to improve the efficiency of a wind energy installation in a simple manner with safety which at least remains the same.

With reference to FIG. 1, this object is achieved by means of a method for operating a wind energy installation 1 having a tower 2, a nacelle 3 which is arranged on the tower and the azimuth of which can be adjusted, and a rotor 4 having at least one rotor blade 5, the blade angle of which can be adjusted, tower oscillations being detected and monitored during operation of the wind energy installation using at least one measuring apparatus 6 and the power operation of the wind energy installation being switched off if a measurement variable, in particular a sliding average, of the tower oscillations exceeds a tower oscillation limit value, which method is developed by virtue of the fact that the tower oscillation limit value is defined, at least during load operation of the wind energy installation, as at least one limit value function which is dependent on the prevailing wind speed, in particular a sliding average of the prevailing wind speed, and/or a parameter associated with the wind speed and has different functional dependencies in a plurality of different value ranges of the wind speed or of the parameter associated therewith. This may be a sliding average of the parameter. Associated parameters are, inter alia, the generator power or the rotor blade angle.

With the transition from previously used constant limit values to a limit value function dependent on the wind speed, it is now possible to parameterize the limit value on the basis of the wind speed in such a manner that only slightly increased oscillation amplitudes which occur permanently, increasingly stress the tower on account of their permanence and reduce its service life or operating life are now also detected. The previously existing design conflict for the limit values, which was previously at the expense of the availability of the installation in the case of strong winds on account of increased triggering operations and did not make it possible to detect oscillations which damage fatigue loads at times of light winds, is therefore eliminated in a simple manner.

As a result of the fact that the wind speed or the parameter associated therewith is divided into a plurality of value ranges in which different functional dependencies of the tower oscillation limit value respectively prevail, it is possible to appropriately take into account different operating states of the wind energy installation, for instance start-up, partial-load operation, full-load operation and switch-off close to a switch-off speed of the wind. Within the scope of the invention, "a plurality of value ranges" are understood as meaning at least two value ranges. It is also possible to provide three, four, five or more value ranges having their own functional dependencies including constant values. Suitable functional dependencies are also linear or quadratic functions, possibly also splines, which are defined in sections.

Transitions of the tower oscillation limit value between different value ranges are preferably continuous, that is to say without sudden changes. This means that a continuous functional curve results. The transition is either associated with an abrupt change in the function in the first derivative or the transition is smoothed in a transition area between the adjoining value ranges of the wind speed or of the parameter dependent on the latter.

It is also now possible to process tolerable oscillation levels which occur in an undisturbed installation and are greatly dependent on the environmental conditions. When operating the installation close to the switch-off speed, high oscillation levels usually occur but they are not critical when considered over the service life on account of the relatively low frequency with which this state occurs. However, if these oscillation levels occurred at nominal wind, for example, they would excessively damage the wind energy installation in the long term. A higher limit value can therefore be used in the vicinity of the switch-off speed than at nominal wind speed in order to pick up the states.

Furthermore, it is now also possible to take into account extraordinary operating states, for example icing of the rotor. It is therefore likewise possible to process a higher load level of the installation in these operating states, for example caused by irregular icing and thus imbalance which increasingly results in oscillations which, however, usually last only for a short time. In these cases, a temporally limited increase in the limit value or the switch-off threshold is permissible and can be taken into account in the function.

In order to model the wind speed dependency of the limit value, provision is advantageously made for the value of the limit value function to correspond to a first limit value $a_{Grenz0}$ or to run below the first limit value $a_{Grenz0}$ at low wind speeds, in particular below a starting speed $v_{Start}$ of the wind energy installation, to decrease toward medium wind speeds, in particular between $v_{Start}$ and a first wind speed limit value $v_{Wind0}$, where $v_{Wind0} > v_{Start}$, and to increase toward high wind speeds, in particular between a second wind speed limit value $v_{Wind1}$ and a third wind speed limit value $v_{Wind2}$, where $v_{Wind2} > v_{Wind1} > v_{Wind0}$, to a value which is greater than the limit value $a_{Grenz0}$.

This definition includes the alternatives in which the limit value $a_{Grenz0}$ is constant in the range of the starting speed and the limit value is variable in this range, for example a ramp which rises or falls with the wind speed or the parameter dependent on the latter, where $a_{Grenz0}$ defines an upper limit for this case. The situation in which the limit value reaches a maximum which is greater than $a_{Grenz0}$ at high wind speeds and then falls again is likewise included. However, the maximum may also be kept constant or may be constant over a limited wind speed range before the limit value falls toward even higher wind speeds again.

The lowest part of the limit value function is in the medium wind speed range, in particular between $v_{Wind0}$ and $v_{Wind1}$. In this range too, the limit value function can either be constant or can continue to change slightly, in particular can decrease to $v_{Wind1}$. In the last-mentioned case, the gradient of the curve changes considerably at $v_{Wind0}$, for example, and flattens out. The profile mentioned is therefore used as an indication of a family of curves having the corresponding supporting points in common, the supporting points being determined or being able to be determined in an installation-specific manner.

This makes it possible to model a low limit value in the range in which the wind energy installation is operated most of the time, namely in the upper partial-load range, that is to say at medium wind speeds, which limit value can be used to detect extraordinary and permanent oscillation states. At high wind speeds, the threshold must not be too low, with the result that, at high wind speeds, the limit value function increases to a greater value which is possibly equal to the previously used higher limit value. At the starting speed, higher tower oscillations can likewise be expected for a short time during start-up and during partial-load operation of the installation since the rotor rotational speed is then close to the tower natural frequency, with the result that a higher limit value than at medium wind speeds for which the installation is designed is set even at the low wind speeds.

In order to be able to take into account extraordinary operating states, the limit value function is dependent on at least one second parameter for one or more special meteorological conditions and/or special operating conditions, the limit value function comprising, in particular, a constant correction term $a_{GrenzOffset}$ or a correction term which is dependent on the wind speed and is added to the tower oscillation limit value when special meteorological conditions or special operating conditions occur.

A special meteorological condition is, for example, icing of the rotor blade(s) or operation in the wake of a preceding or upstream wind energy installation. Wake operation is dependent on the wind direction. Corresponding second parameters are a degree of icing and/or a measure of wake turbulence. Special operating conditions are, for example, power reduction or rotational speed reduction on account of sound, network or other restrictions. The second parameter is then a measure of the power reduction and/or rotational speed reduction.

Since such extraordinary operating states likewise indeed result in greater tower oscillations but usually occur only for temporally very limited periods, a positive additive term can be added to the function in these cases in the simplest case, which term is either constant or is dependent on the wind speed. For example, in the event of icing of the rotor blades, the function can be defined using an offset which is dependent on the wind speed and the value of which decreases with increasing wind speed in order to avoid jeopardizing the wind energy installation at high wind speeds as a result of excessive additional loads. Offsets which are introduced on the basis of inflow conditions or turbulence may also be dependent on the wind speed. However, a simpler possibility is a constant term which can be omitted from the function again when the special operating condition does not apply.

Provision is also advantageously made for a positive additive term to be added in the event of a change from one operating state to another for a short period. The period may advantageously be 1 to 10 minutes. This takes account of the effect whereby, in the event of a change of the operating state, an increased oscillation level occurs which then stabilizes within a few minutes. Alternatively, the oscillation monitoring may be provided with a sufficiently large average, for example 5 or 10 minutes. The change of the operating state is also, in particular, a special operating condition, with the result that the additive term is identified with the offset $a_{GrenzOffset}$ in this case.

It is preferred if the value of the limit value function does not undershoot a minimum first limit value $a_{Grenz1}$ which is used, in particular, at a medium wind speed or in a medium wind speed range. The limit value function according to the invention is therefore also used to avoid the installation being switched off too often in an undesirable manner.

It is likewise advantageous if the value of the limit value function does not exceed a maximum second limit value $a_{Grenz2}$ which is used, in particular, at high wind speeds. The maximum second limit value limits the tower oscillations in an absolute manner and is also used for the safety of the installation.

An averaging duration for the tower oscillations is advantageously greater than an averaging duration for the prevailing wind speed, in particular by at least a factor of 5, in particular by at least a factor of 10. The averaging duration for the tower oscillations may be selected to be comparatively long since greater account is thus taken of the permanent stresses of the tower which may adversely affect the service life of the tower more severely than individual deflections. In contrast, the wind speed may be averaged over a shorter period so that an appropriate limit value from the limit value function is available at any time as a comparison barometer. At the same time, the previously used monitoring with limit values can also continue to be operated for an averaging duration of a few tower half-oscillations in order to intercept dangerous individual oscillation events.

The sliding average of the tower oscillations is preferably averaged over a duration of several minutes, in particular between 2 and 20 minutes, and/or the sliding average of the prevailing wind speed is averaged over a duration of several seconds, in particular between 10 and 60 seconds. These time ranges provide indicators of a favorable design of the method for a wide variety of wind energy installations. The specific sliding periods or averaging periods and the limit values and the profile of the function can be determined in the design phase by means of computer simulations and can preferably be adapted in situ after the wind energy installation has been installed and started up in accordance with the prevailing site conditions.

In order to evaluate the wind speed, it has proved to be advantageous to provide a long-term average in addition to the above-mentioned short-term average. The wind speed is preferably determined as a maximum from a 30-second average and a 10-minute average. Alternatively, it is also advantageously possible to use other filtering of the measured values, in particular low-pass filters, in order to form the average.

A tower acceleration is preferably measured as the measurement variable for the tower oscillations. According to the invention, it is also possible to use other measurement variables with strain gauges on the tower, for example, or other known measuring devices which can be used to measure an oscillation amplitude, oscillation acceleration or the like.

In one advantageous development, two different limit value functions are used for tower oscillations in the direction of the rotor axis and for tower oscillations in a plane perpendicular to the rotor axis. This takes into account the fact that both the exciting forces and the damping acting on the tower are different parallel to the wind direction and transverse to the wind direction, with the result that different limit values can also be used for the tower oscillations in these directions or for the oscillation components in these directions.

For safety reasons, the monitoring and calculation algorithm is preferably integrated in the software of an operation control device of the wind energy installation. Alternatively, the monitoring is advantageously carried out as part of remote monitoring, for example remote monitoring of a wind energy installation farm.

The object on which the invention is based is also achieved by means of a wind energy installation having a tower, a nacelle which is arranged on the tower and the azimuth of which can be adjusted, and a rotor having at least one rotor blade, the blade angle of which can be adjusted, at least one measuring apparatus which is designed and arranged for detecting tower oscillations, and an operation control device which comprises, in particular, a data processing system with operation control software which is set up to monitor the tower oscillations and to switch off power operation of the wind energy installation if a tower oscillation limit value is exceeded by a sliding average of the tower oscillations, which installation is developed by virtue of the fact that at least one limit value function is defined as the tower oscillation limit value in the operation control device, in particular the operation control software, which limit value function is dependent on the prevailing wind speed, in particular a sliding average of the prevailing wind speed. This wind energy installation is preferably designed, in particular using the operation control software, to carry out a method according to the invention as described above.

In comparison with the previously pursued, very rough concept of oscillation monitoring, damage of the wind energy installation which goes beyond the normal degree, for example caused by moderately severe imbalances, can be detected in a simple and safe manner using the subject matters of the invention and it is possible to react thereto. The monitoring can be set in such a manner that narrower limits apply to load situations with a high frequency than to individual short events, for example strong wind events which, although having large amplitudes, are scarcely reflected in the operational stability on account of the low frequency with which they occur.

The advantage is therefore, on the one hand, higher availability in the case of light winds and strong winds and therefore an improvement in efficiency and, on the other hand, the introduction of more accurate monitoring which is very advantageous, for example, at the latest for operation under special conditions, for example ice.

The operation of a wind energy installation is likewise enabled for the first time in a simple manner to also detect, via the monitoring level of the tower oscillations, faults, and in particular faults which significantly shorten the service life, in control systems, that is to say the software, the hardware and in the calibration processes carried out by the personnel, for example in the tower damping control.

Since a wind energy installation is calculated for a particular wind class, this method makes it possible to set up monitoring according to the specification by stipulating the characteristic curve, that is to say the limit value function.

Further features of the invention become clear from the description of embodiments according to the invention together with the claims and the accompanying drawings. Embodiments according to the invention may comply with individual features or a combination of a plurality of features.

BRIEF DESCRIPTION OF THE DRAWINGS

The invention is described below, without restricting the general concept of the invention, using exemplary embodiments with reference to the drawing, in which case, with respect to all details according to the invention which are not explained in any more detail in the text, reference is expressly made to the drawing, in which.

DETAILED DESCRIPTION OF THE INVENTION

The limit value $a_{Grenz1}$ is plotted on the Y axis of the graph, and the wind speed $v_{Wind}$ is plotted on the X axis. The possible range of limit values is restricted by a lower limit value $a_{Grenz1}$ and an upper limit value $a_{Grenz2}$, below or above which the limit value function $a_{Grenz}$ does not deviate.

At a wind speed below the starting wind speed which, depending on the wind energy installation, is a few meters per second, the base value of the function $a_{Grenz}$, which is indicated with a bold line, has a value $a_{Grenz0}$ and is constant. The endpoint of this constant range of the function is indicated by $P_1$. At this point, the limit value $a_{Grenz0}$ is normally between 5 and 30 mG (the unit mG denotes one thousandth of the gravitational acceleration) depending on the wind energy installation type. In a similar manner, the tower acceleration as the measurement variable for tower oscillations may also be replaced with other suitable measurement variables, for instance strain gauges, position sensors or the like.

Between the points $P_1$ and $P_2$, that is to say at wind speeds between the installation-specific starting wind speed and a wind speed $v_{Wind0}$ which corresponds, for instance, to a lower variable-speed range, the value of the limit value function decreases continuously, and in a linear manner in the exemplary embodiment, until the lower limit value $a_{Grenz1}$ is reached at point $P_2$. Depending on the installation, the wind speed $v_{Wind0}$ is between 3 and 10 m/s and may be included as a value for $v_{Wind0}$ up to the nominal wind speed $v_{rated}$, for example. At point $P_2$, the lower limit value $a_{Grenz1}$ is reached, which lower limit value is between 3 and 30 mG in an installation-specific manner. It is advantageously lower than the value $a_{Grenz0}$.

Figure 1:
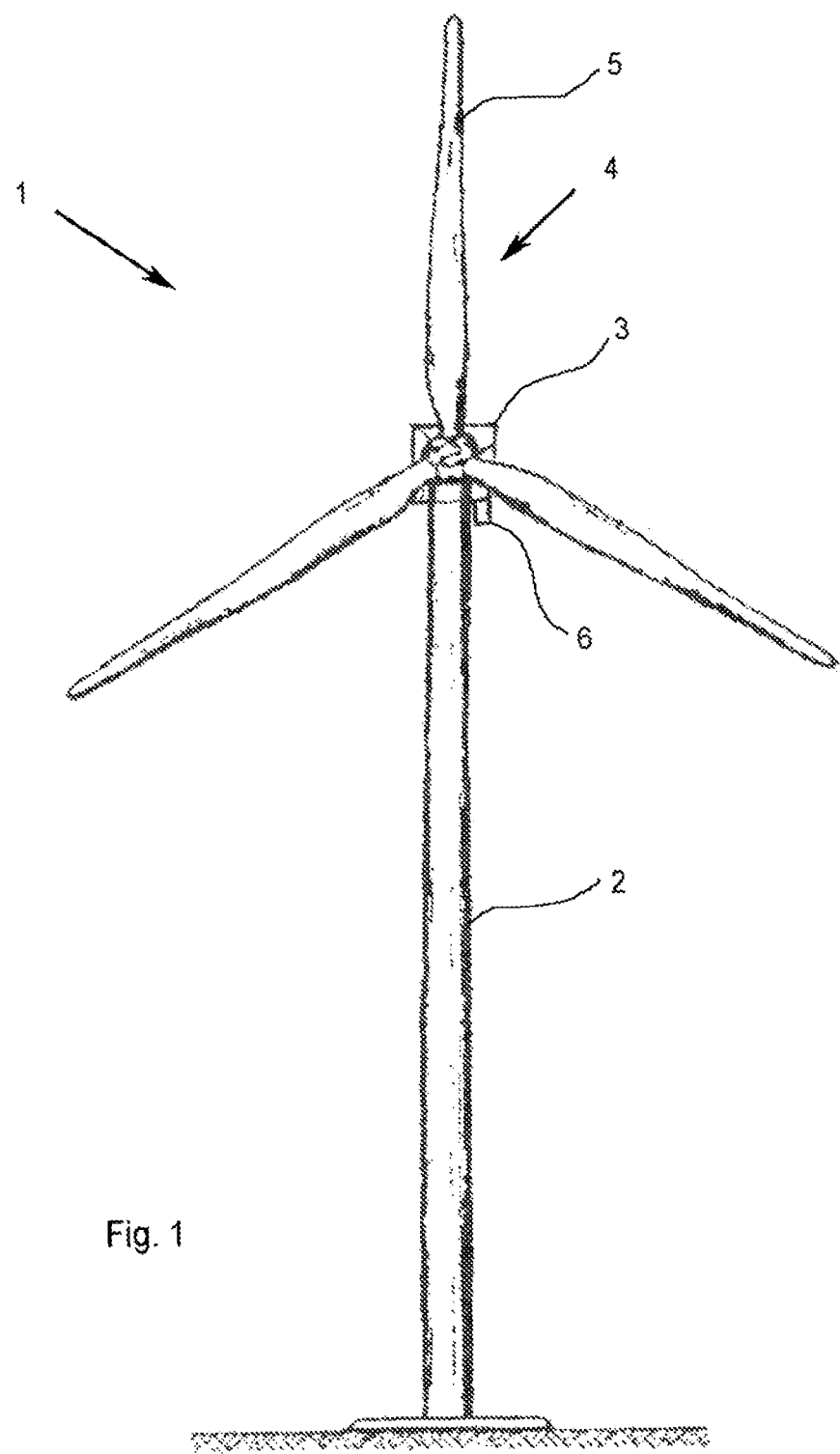
FIG. 1 shows a wind energy installation 1 having a tower 2, a nacelle 3 which is arranged on the tower and the azimuth of which can be adjusted, and a rotor 4 having at least one rotor blade 5, the blade angle of which can be adjusted, tower oscillations being detected and monitored during operation of the wind energy installation using at least one measuring apparatus 6.

In the example according to FIG. 1, the value of the limit value function $a_{Grenz}$ between the points $P_2$ and $P_3$ is constant at the value $a_{Grenz1}$, the point $P_3$ corresponding to a wind speed $v_{Wind1}$ which is between 10 and 15 m/s in an installation-specific manner and corresponds approximately to the nominal wind for the wind energy installation.

Beyond the nominal wind speed or wind speed $v_{Wind1}$, the value of the function $a_{Grenz}$ again increases continuously, and in a linear manner in the exemplary embodiment, to the point $P_4$ at which the upper limit value $a_{Grenz2}$ is reached, which upper limit value is generally between 10 and 40 mG. Above the point $P_4$, the value of the limit value function $a_{Grenz}$ is then constant at this value $a_{Grenz2}$. The wind speed $v_{Wind2}$ at the point $P_4$ is approximately 22 to 30 m/s and corresponds approximately to the switch-off speed of the wind energy installation and should be greater than the nominal wind speed.

A somewhat thinner line is used to represent the function $a_{Grenz}$, for which a constant offset $a_{GrenzEisOffset}$ is added, which is taken into account in the case of an iced state of the rotor blades of the wind energy installation. In this case, greater imbalances and greater tower oscillation states occur for a relatively short time. In order to avoid the wind energy installation being unnecessarily switched off in an undesirable manner in this case, the limit value function $a_{Grenz}$ is increased by the offset $a_{GrenzEisOffset}$. The curve also ends with the offset $a_{GrenzEisOffset}$ at a maximum at the upper limit value $a_{Grenz2}$ which, however, is already reached in this case at lower wind speeds, that is to say before reaching $v_{Wind2}$.

In this case, one preferred development provides for an offset which varies with the wind speed or a parameter associated with the latter. In order to reduce high oscillation amplitudes, provision is preferably made in this case for the offset to be continuously reduced in the range between $v_{Wind1}$ and $v_{Wind2}$, with the result that the limit value $a_{Grenz2}$ is reached only at $v_{Wind2}$, that is to say at the point P4.

The exemplary embodiment which is illustrated in FIG. 1 and has a plurality of linear curve sections which are continuously placed next to one another forms a method which is particularly simple to implement. Alternatively, it is naturally also possible to select another function which has fewer bends or no bends, for example a spline-interpolated function over a plurality of supporting points or a function which is completely continuous also in the first derivative and possibly also the second derivative.

Figure 2:
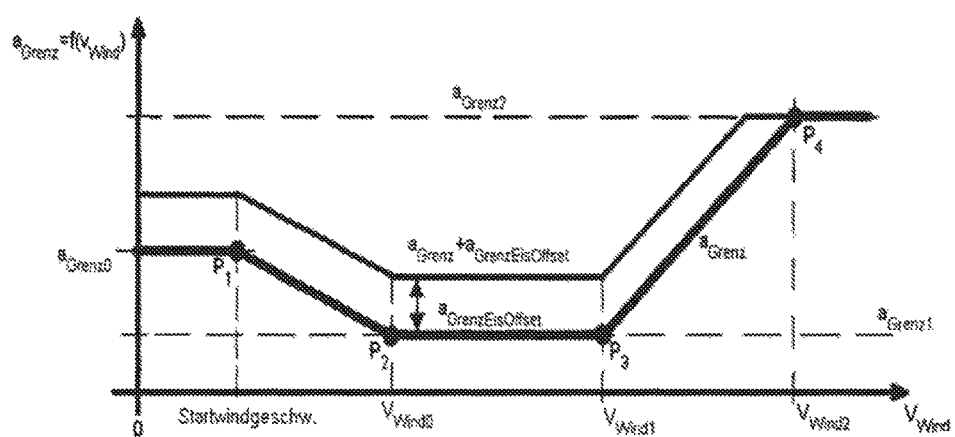
FIG. 2 shows a graph of a limit value function aGrenz according to the invention.

The table below explains the parameter ranges in FIG. 2. The X direction is used to denote the oscillations in the direction of the rotor axis and Y is used to denote the oscillations transverse to the rotor axis. For each individual parameter, a preferred embodiment comprises the choice of the parameter in the range between minimum and maximum. In particularly preferred embodiments, an individual parameter or a selection of parameters is set in the range of the "normal range".

| Parameter | Unit | MIN | Normal Range | MAX | Note |
|---|---|---|---|---|---|
| $v_{Wind0}$ | m/s | $V_{Start}$ | 3-10 | $V_{Rated}$ | 2) |
| $a_{Grenz0}$ | mG | 10 | 5-30 | 50 | 1) |
| $v_{Wind1}$ | m/s | $>a_0$ | 10-15 | 20 | 3) |
| $a_{Grenz1}$ | mG | $\leq a_0$ | 3-30 | 50 | |
| $v_{Wind2}$ | m/s | $V_{Rated}$ | 22-30 | 30 | 4) |
| $a_{Grenz2}$ | mG | 10 | 10-40 | 50 | |
| $a_{GrenzEisOffset}$ | mG | 0 | 3-20 | 30 | |

In this case, note
1) means that the limit value is possibly dependent on the hub height,
2) means the lower variable-speed range,
3) means the nominal wind range, and
4) means the switch-off speed.

The parameters $v_{Wind0}$, $v_{Wind1}$ and $v_{Wind2}$ are the first, second and third wind speed values in the characteristic curve of the maximum permissible tower oscillation, whereas $a_{Grenz0}$, $a_{Grenz1}$ and $a_{Grenz2}$ respectively denote the first, second and third limit values in the characteristic curve of the maximum permissible tower oscillation. $a_{GrenzEisOffset}$ is the offset for maximum permissible tower oscillations for the special condition of icing of the rotor blades. The individual parameters may each be defined differently for the X and Y directions parallel and transverse to the rotor axis of rotation.

All of the features mentioned, including the features which can be gathered from the drawing alone and individual features which are disclosed in combination with other features, are considered to be essential to the invention alone and in combination. Embodiments according to the invention may be complied with by individual features or a combination of a plurality of features.

What is claimed is:

1. A method for operating a wind energy installation having a tower, a nacelle arranged on the tower, and a rotor having at least one rotor blade, wherein an azimuth of the nacelle is adjustable, wherein a blade angle of the at least one rotor blade is adjustable, the method comprising:
   detecting and monitoring tower oscillations during operation of the wind energy installation using at least one measuring apparatus; and
   switching off power operation of the wind energy installation if a measurement variable of the tower oscillations exceeds a tower oscillation limit value;
   wherein the tower oscillation limit value is defined, at least during load operation of the wind energy installation, as at least one limit value function which is dependent on prevailing wind speed and/or a parameter associated therewith, and which has different functional dependencies in a plurality of different value ranges of prevailing wind speed and/or the parameter associated therewith.

2. The method as claimed in claim 1, wherein the measurement variable is a sliding average.

3. The method as claimed in claim 2, wherein the sliding average is of prevailing wind speed and/or a parameter associated therewith.

4. The method as claimed in claim 3, wherein the tower oscillation limit value has different functional dependencies in a plurality of different value ranges of the sliding average of prevailing wind speed and/or the parameter associated therewith.

5. The method as claimed in claim 1, wherein the value of the limit value function corresponds to a first limit value $a_{Grenz0}$ or runs below a first limit value $a_{Grenz0}$ at wind speeds below a starting speed $v_{Start}$ of the wind energy installation, decreases toward wind speeds between $v_{Start}$ and a first wind speed limit value $v_{Wind0}$, where $v_{Wind0} > v_{Start}$, and increases toward wind speeds between a second wind speed limit value $v_{Wind1}$ and a third wind speed limit value $v_{Wind2}$, where $v_{Wind2} > v_{Wind1} > v_{Wind0}$, to a value which is greater than the limit value $a_{Grenz0}$.

6. The method as claimed in claim 1, wherein the limit value function is dependent on at least one second parameter for one or more special meteorological conditions and/or special operating conditions, the limit value function comprising a constant correction term $a_{GrenzOffset}$ or a correction term, which is dependent on the wind speed and is added to the tower oscillation limit value when special meteorological conditions or special operating conditions occur.

7. The method as claimed in claim 1, wherein a positive additive term or offset is added in the event of a change from one operating state to another for a short period.

8. The method as claimed in claim 7, wherein the short period is from 1 to 10 minutes.

9. The method as claimed in claim 1, wherein the value of the limit value function does not undershoot a minimum first limit value $a_{Grenz1}$.

10. The method as claimed in claim 9, wherein the minimum first limit value $a_{Grenz1}$ is used at a medium wind speed or in a medium wind speed range.

11. The method as claimed in claim 1, wherein the value of the limit value function does not exceed a maximum second limit value $a_{Grenz2}$.

12. The method as claimed in claim 11, wherein the maximum second limit value $a_{Grenz2}$ is used at high wind speeds.

13. The method as claimed in claim 1, wherein an averaging duration for the tower oscillations is greater than an averaging duration for the prevailing wind speed by at least a factor of 5.

14. The method as claimed in claim 1, wherein an averaging duration for the tower oscillations is greater than an averaging duration for the prevailing wind speed by at least a factor of 10.

15. The method as claimed in claim 1, wherein the sliding average of the tower oscillations is averaged over a duration of between 2 and 20 minutes, and/or the sliding average of the prevailing wind speed is averaged over a duration of between 10 and 60 seconds.

16. The method as claimed in claim 1, wherein tower acceleration is measured as the measurement variable for the tower oscillations.

17. The method as claimed in claim 1, wherein two different limit value functions are used for tower oscillations in a direction of a rotor axis and for tower oscillations in a plane perpendicular to the rotor axis.

18. A wind energy installation comprising:
a tower;
a nacelle arranged on the tower, wherein an azimuth of the nacelle is adjustable;
a rotor having at least one rotor blade, wherein a blade angle of the at least one rotor blade is adjustable;
at least one measuring apparatus configured and arranged to detect tower oscillations; and
an operation control device comprising a data processing system with operation control software set up to monitor the tower oscillations and to switch off power operation of the wind energy installation if a tower oscillation limit value is exceeded by the tower oscillations;
wherein at least one limit value function is defined as the tower oscillation limit value in the operation control software, which limit value function is dependent on prevailing wind speed and/or a parameter associated therewith, and
wherein the at least one limit value function, which is dependent on prevailing wind speed and/or a parameter associated therewith, has different functional dependencies in a plurality of different value ranges of prevailing wind speed and/or a parameter associated therewith.

19. The wind energy installation as claimed in claim 18, wherein the operation control software is set up to monitor the tower oscillations and to switch off power operation of the wind energy installation if a tower oscillation limit value is exceeded by a sliding average of the tower oscillations.

20. The wind energy installation as claimed in claim 18, wherein the limit value function is dependent on a sliding average of prevailing wind speed.

* * * * *